(12) United States Patent
Aston et al.

(10) Patent No.: US 9,027,889 B2
(45) Date of Patent: May 12, 2015

(54) MODULAR CORE STRUCTURE FOR DUAL-MANIFEST SPACECRAFT LAUNCH

(71) Applicant: The Boeing Company, Chicago, IL (US)

(72) Inventors: Richard W. Aston, Brea, CA (US); Anna M. Tomzynska, Seal Beach, CA (US); Michael J. Langmack, Huntington Beach, CA (US); James J. Peterka, III, Rancho Palos Verdes, CA (US)

(73) Assignee: The Boeing Comapny, Chicago, IL (US)

( * ) Notice: Subject to any disclaimer, the term of this patent is extended or adjusted under 35 U.S.C. 154(b) by 402 days.

(21) Appl. No.: 13/781,373

(22) Filed: Feb. 28, 2013

(65) Prior Publication Data

US 2014/0239125 A1   Aug. 28, 2014

(51) Int. Cl.
| | |
|---|---|
| *B64G 1/64* | (2006.01) |
| *B64G 1/40* | (2006.01) |
| *B64G 1/00* | (2006.01) |
| *B64G 1/10* | (2006.01) |

(52) U.S. Cl.
CPC ........... *B64G 1/641* (2013.01); *B64G 1/402* (2013.01); *B64G 2001/643* (2013.01); *B64G 1/002* (2013.01); *B64G 1/1085* (2013.01); *B64G 2001/1092* (2013.01)

(58) Field of Classification Search
CPC .................... B64G 1/641; B64G 2001/643
USPC .................... 244/171.3, 173.1, 173.3
See application file for complete search history.

(56) References Cited

U.S. PATENT DOCUMENTS

| | | | | | |
|---|---|---|---|---|---|
| 3,420,470 | A | * | 1/1969 | Meyer ..................... | 244/173.3 |
| 4,009,851 | A | * | 3/1977 | Cable ....................... | 244/173.1 |
| 4,896,848 | A | * | 1/1990 | Ballard et al. ............ | 244/171.3 |
| 5,052,640 | A | * | 10/1991 | Chang ...................... | 244/172.7 |
| 5,199,672 | A | * | 4/1993 | King et al. ................ | 244/173.3 |
| 5,314,146 | A | * | 5/1994 | Chicoine et al. .......... | 244/173.1 |
| 5,522,569 | A | * | 6/1996 | Steffy et al. ............... | 244/158.1 |
| 5,527,001 | A | * | 6/1996 | Stuart ....................... | 244/159.4 |
| 5,641,135 | A | * | 6/1997 | Stuart et al. ............... | 244/172.6 |
| 5,765,784 | A | * | 6/1998 | Lapins ...................... | 244/173.3 |
| 5,779,195 | A | * | 7/1998 | Basuthakur et al. ....... | 244/173.1 |
| 5,848,767 | A | * | 12/1998 | Cappa et al. .............. | 244/158.1 |
| 5,976,833 | A | | 11/1999 | Furukawa et al. | |
| 5,979,833 | A | | 11/1999 | Eller et al. | |
| 6,193,193 | B1 | | 2/2001 | Soranno et al. | |
| 6,206,327 | B1 | * | 3/2001 | Benedetti et al. ......... | 244/159.4 |

(Continued)

FOREIGN PATENT DOCUMENTS

EP      0849166        6/1998

OTHER PUBLICATIONS

Eurasian Patent Office Search Report for Application No. 201490366 and dated Feb. 27, 2014.

*Primary Examiner* — Joseph W Sanderson

(57) ABSTRACT

A spacecraft may include an upper core structure or a lower core structure. The upper core structure may include an upper cylinder for supporting an upper spacecraft of a dual-manifest launch configuration. The lower core structure may include a lower cylinder for supporting a lower spacecraft with the upper cylinder mounted on top of the lower cylinder. The upper cylinder may have an upper cylinder inner diameter that may be substantially similar to the lower cylinder inner diameter.

20 Claims, 11 Drawing Sheets

(56) References Cited

U.S. PATENT DOCUMENTS

| | | | |
|---|---|---|---|
| 6,322,023 B1 * | 11/2001 | Soranno et al. | 244/159.4 |
| 6,494,406 B1 * | 12/2002 | Fukushima et al. | 244/173.3 |
| 6,543,724 B1 * | 4/2003 | Barnett | 244/172.6 |
| 7,578,482 B2 * | 8/2009 | Duden | 244/171.7 |
| 7,669,804 B2 * | 3/2010 | Strack et al. | 244/172.4 |
| 7,840,180 B2 * | 11/2010 | Rosen | 455/12.1 |
| 7,931,237 B2 | 4/2011 | Penzo | |
| 8,016,240 B2 * | 9/2011 | Caplin et al. | 244/158.5 |
| 8,511,617 B2 * | 8/2013 | Caplin et al. | 244/173.1 |
| 8,789,797 B2 * | 7/2014 | Darooka | 244/173.1 |
| 2002/0000495 A1 * | 1/2002 | Diverde et al. | 244/137.1 |
| 2003/0150958 A1 * | 8/2003 | Herbert | 244/158 R |
| 2006/0278765 A1 * | 12/2006 | Strack et al. | 244/172.4 |
| 2008/0078886 A1 * | 4/2008 | Foster et al. | 244/173.1 |
| 2008/0155610 A1 * | 6/2008 | Rosen | 725/64 |
| 2008/0237399 A1 * | 10/2008 | Caplin et al. | 244/158.4 |
| 2008/0265098 A1 * | 10/2008 | Connelly et al. | 244/158.1 |
| 2009/0224105 A1 * | 9/2009 | Caplin et al. | 244/158.4 |
| 2013/0221162 A1 * | 8/2013 | Darooka | 244/173.1 |
| 2013/0299641 A1 * | 11/2013 | Aston et al. | 244/171.1 |
| 2014/0239125 A1 * | 8/2014 | Aston et al. | 244/172.3 |

* cited by examiner

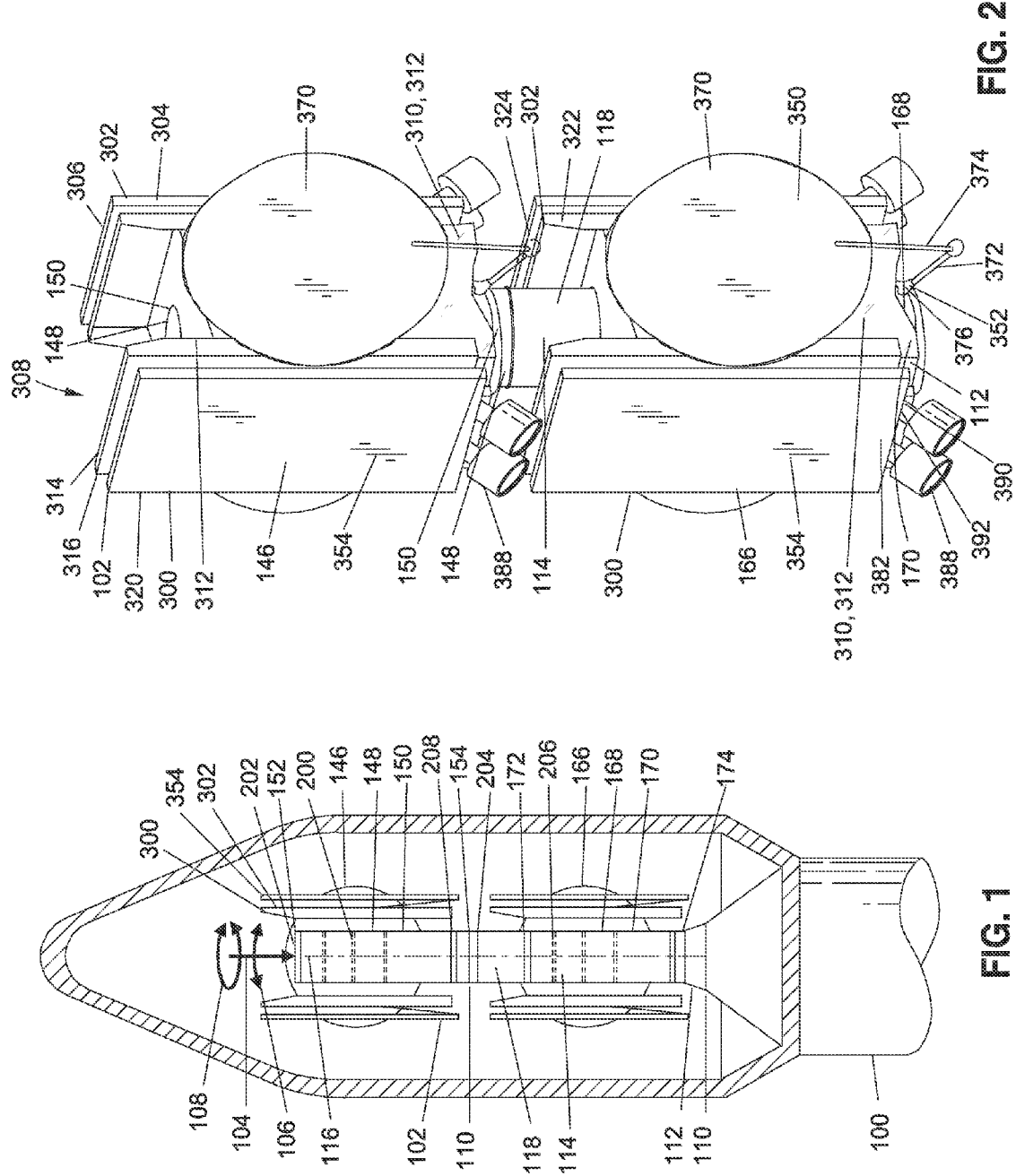

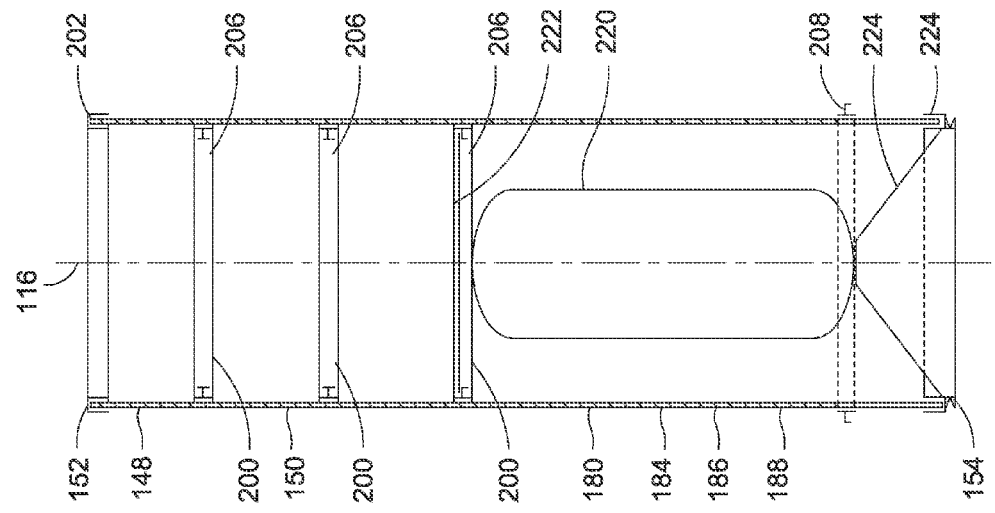
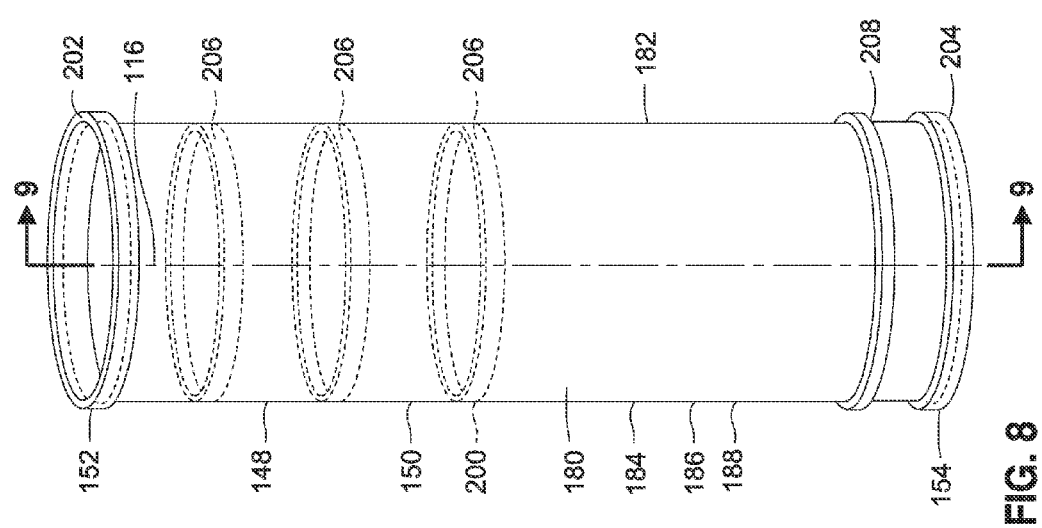

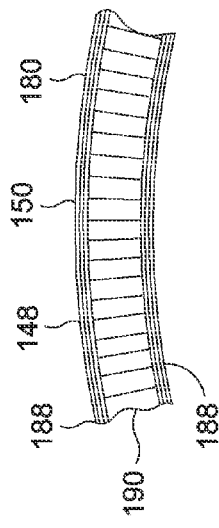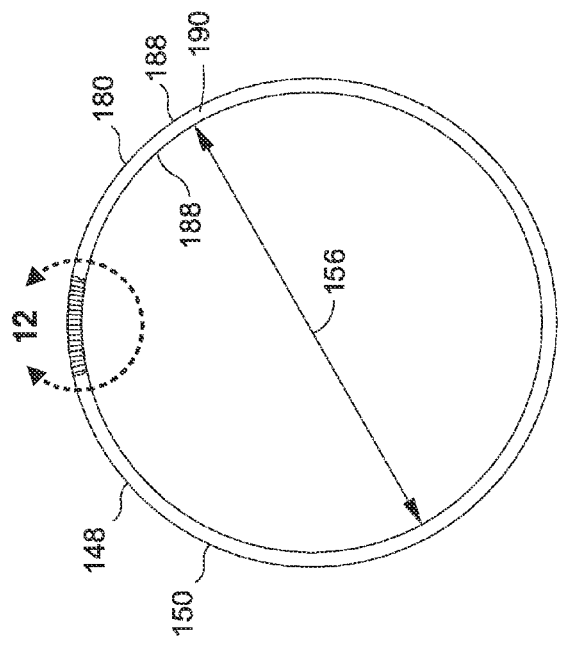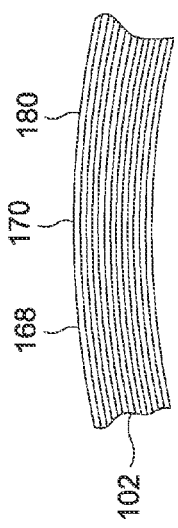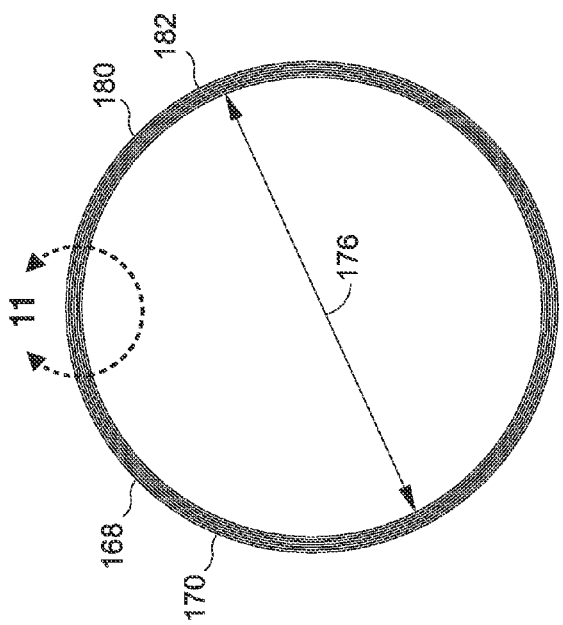

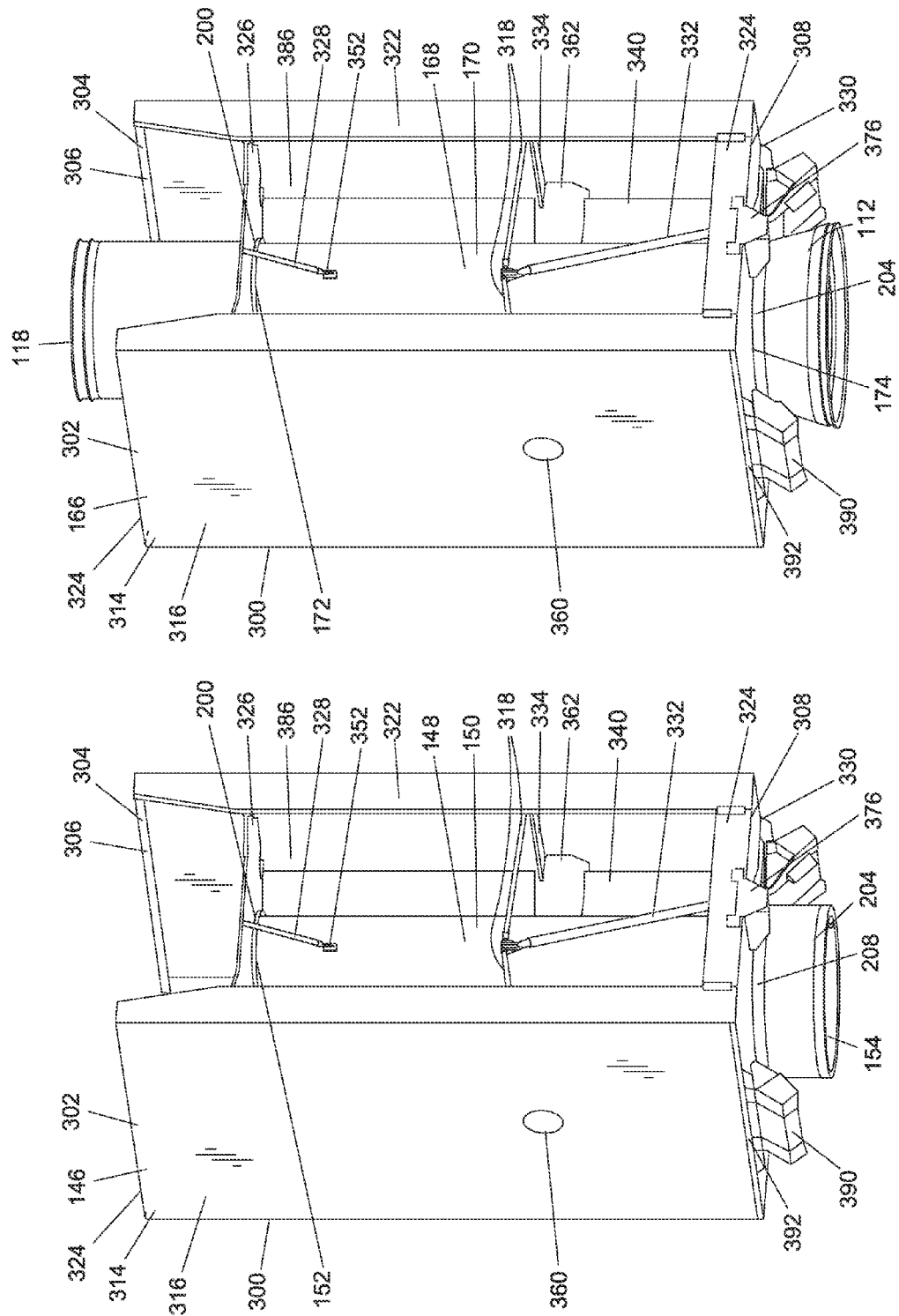

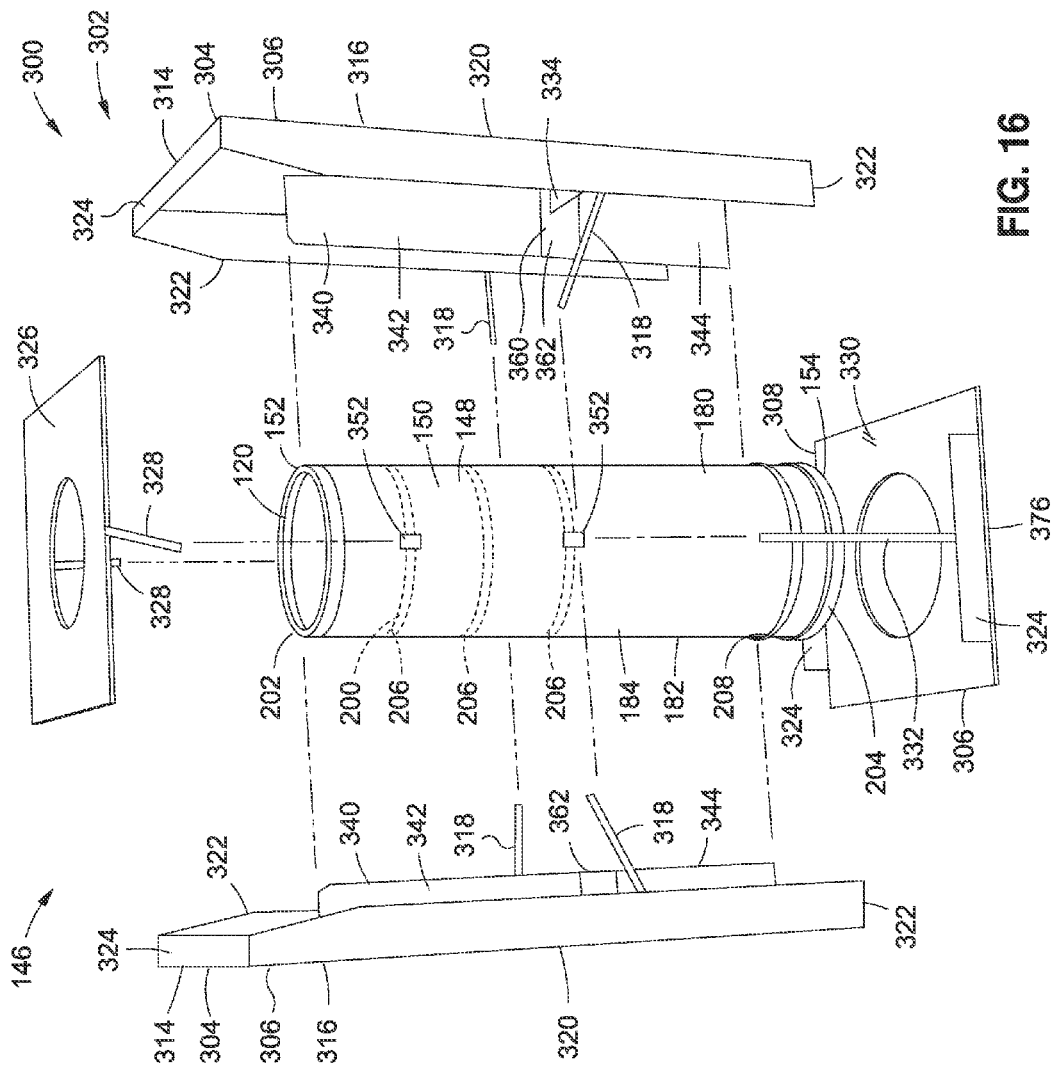

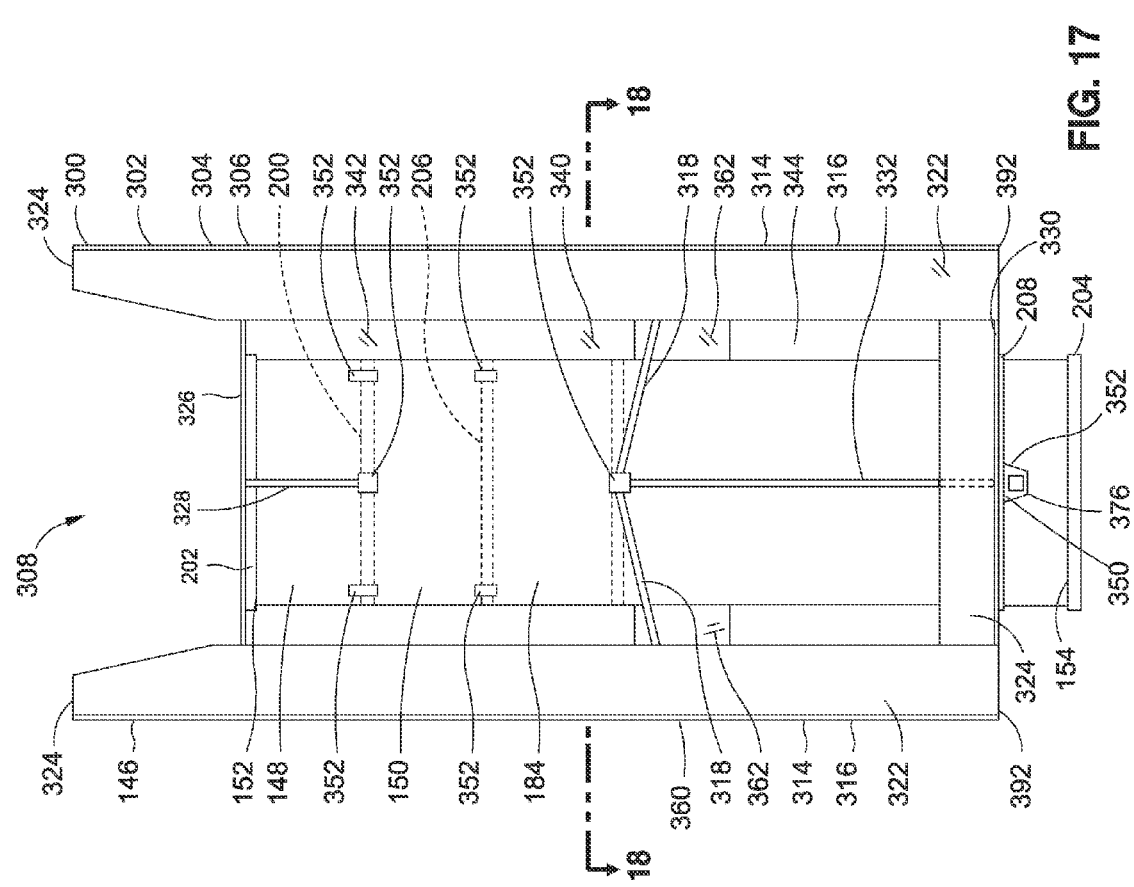

MODULAR CORE STRUCTURE FOR DUAL-MANIFEST SPACECRAFT LAUNCH

FIELD

The present disclosure relates generally to structural configurations and, more particularly, to support structures for spacecraft.

BACKGROUND

The cost of launching a satellite into space is relatively high. For example, the cost of inserting a single communications satellite into orbit using an expendable launch vehicle can exceed $100 million. The cost to launch a spacecraft can be significantly reduced by launching two or more spacecraft on a single launch vehicle. One method of launching multiple spacecraft with a single launch vehicle is by positioning one of the spacecraft above the other spacecraft within the launch vehicle in a dual-manifest arrangement.

One drawback for such an arrangement is the relatively high bending loads on the lower spacecraft structure due to the distance between the upper spacecraft and the launch vehicle interface relative to the shorter distance from the lower spacecraft to the launch vehicle interface. Such high bending loads may be induced as a result of aerodynamic turbulence acting on the launch vehicle at high altitudes. In a dual-manifest arrangement, the structure supporting the upper spacecraft must be capable of transmitting the loads from the upper spacecraft into the launch vehicle. In addition, the structure must possess the required stiffness characteristics while supporting the upper spacecraft.

Unfortunately, the structure supporting the upper spacecraft may require a different configuration than the structure supporting the lower spacecraft. The different structural configurations of the upper and lower spacecraft may negatively impact cost and schedule due to the unique design, analysis, manufacturing, and testing requirements of the upper spacecraft structure and the lower spacecraft structure. For example, the different structural configurations of the upper and lower spacecraft may necessitate different tooling and assembly fixtures, different planning and build instructions, and different ground support equipment, all of which increases the overall cost and schedule for launching the spacecraft into orbit.

As can be seen, there exists a need in the art for a structural arrangement for an upper and lower spacecraft of dual-manifest launch which can be provided at reduced cost.

SUMMARY

The above-noted needs associated with spacecraft structures are specifically addressed and alleviated by the present disclosure which provides a spacecraft which may include an upper core structure or a lower core structure. The upper core structure may include an upper cylinder for supporting an upper spacecraft of a dual-manifest launch configuration. The lower core structure may include a lower cylinder for supporting a lower spacecraft with the upper cylinder mounted on top of the lower cylinder. The upper cylinder may have an upper cylinder inner diameter that may be substantially similar to the lower cylinder inner diameter.

In a further embodiment, the lower cylinder may be formed as a solid laminate of fiber-reinforced polymer matrix material. The upper cylinder may be formed as a composite sandwich having a pair of laminated face sheets formed of fiber-reinforced polymer matrix material. The laminated face sheets may be separated by a core layer. The upper cylinder and the lower cylinder may be coupled to a common electronics module at common interface locations. For example, the upper cylinder and the lower cylinder may each have a reinforcing ring at the interface locations for coupling the electronics module to the upper cylinder and lower cylinder.

Also disclosed is a method of assembling a spacecraft for a dual-manifest launch configuration. The method may include supporting an upper spacecraft using an upper cylinder, and supporting a lower spacecraft using a lower cylinder with the upper cylinder mounted on top of the lower cylinder. The method may further include providing the upper cylinder in an upper cylinder inner diameter that may be substantially similar to a lower cylinder inner diameter.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a cross-sectional illustration of a pair of spacecraft encapsulated within a launch vehicle and including an upper spacecraft and a lower spacecraft stacked on top of one another in a dual manifest launch configuration;

FIG. 2 is a perspective illustration of an embodiment of the upper and lower spacecraft;

FIG. 8 is a perspective illustration of the upper cylinder and illustrating a plurality of internal rings positioned at interface locations for attaching an electronics module to the upper cylinder;

FIG. 9 is a side sectional illustration of the upper cylinder taken along line 9 of FIG. 8 and illustrating the internal rings mounted to the upper cylinder and a propellant tank housed within the upper cylinder;

FIG. 10 is a cross-sectional illustration of the lower cylinder taken along line 10 of FIG. 7;

FIG. 11 is an enlarged cross-sectional illustration of a portion of the lower cylinder wall illustrating a solid laminate construction thereof;

FIG. 12 is a cross-sectional illustration of the upper cylinder taken along line 12 of FIG. 6;

FIG. 13 is an enlarged cross-sectional illustration of a portion of the upper cylinder wall illustrating a composite sandwich construction thereof;

FIG. 14 is a perspective illustration of a module structure of a common electronics module coupled to the upper cylinder at a plurality of common interface locations;

FIG. 15 is a perspective illustration of the module structure of FIG. 14 coupled to the lower cylinder at the plurality of common interface locations;

FIG. 16 is an exploded perspective illustration of a common module structure and the interconnection thereof to the upper cylinder at the plurality of common interface locations;

FIG. 17 is a side view of the common module structure and a plurality of braces coupling the module structure to the common interface locations on the upper cylinder;

DETAILED DESCRIPTION

Figure 3:
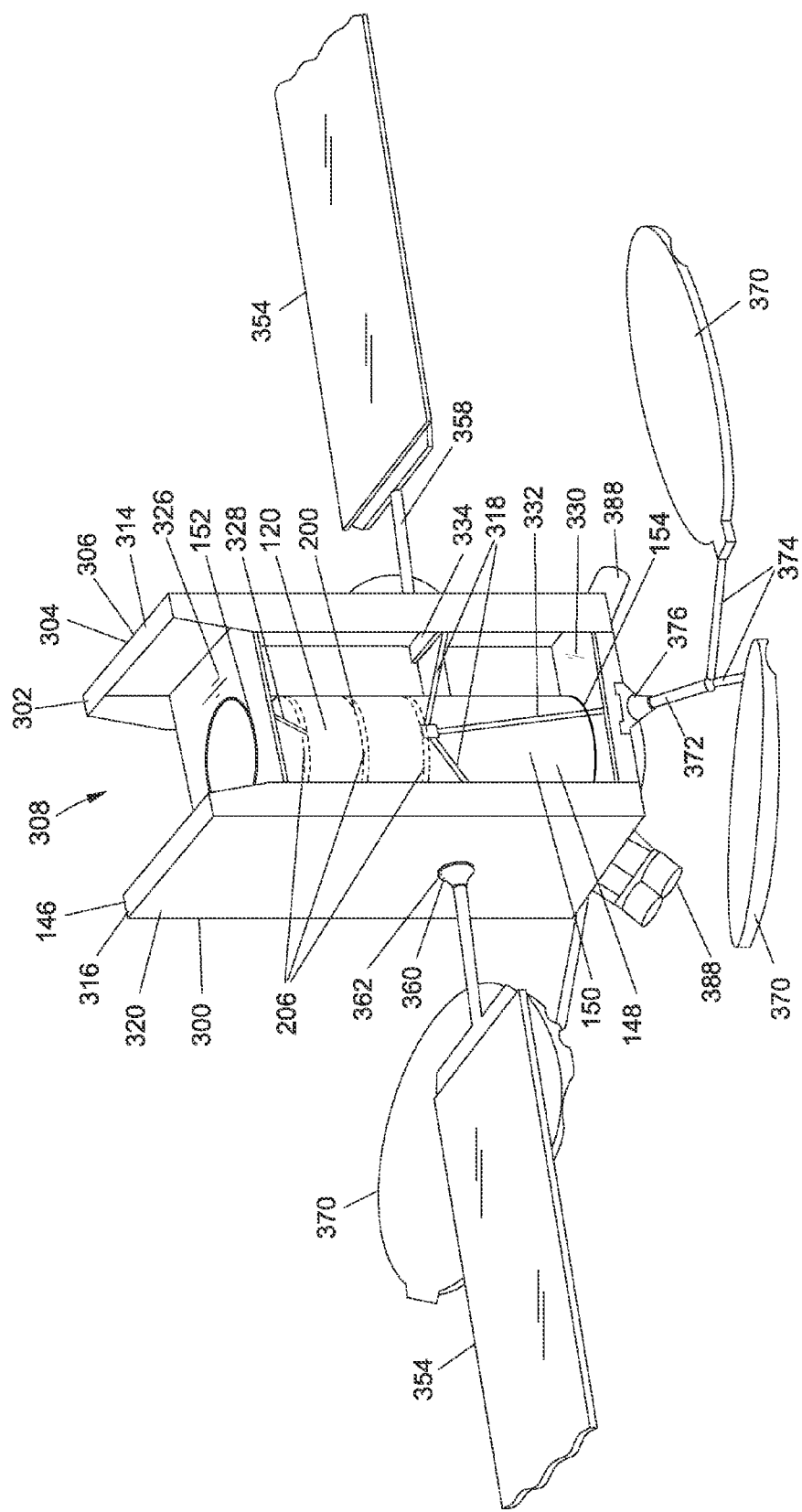
FIG. 3 is a perspective illustration of the upper spacecraft with the solar panels and the antennae in a deployed position.

Referring now to the drawings wherein the showings are for purposes of illustrating preferred and various embodiments of the disclosure, shown in FIG. 1 is a sectional illustration of a pair of spacecraft 146, 166 stacked on top of one another in a dual-manifest launch configuration 102 and encapsulated within a launch vehicle 100. The upper and lower spacecraft 146, 166 may be communications satellites which may be supported on a central core structural assembly 114 having a cylindrical configuration and extending vertically through the center of the spacecraft 146, 166 from a top end of the upper spacecraft 146 down to a payload attach fitting 112 where the core structural assembly 114 interfaces with the launch vehicle 100 at the bottom end 174 of the lower spacecraft 166. The upper spacecraft 146 may have an upper core structure 148 and the lower spacecraft 166 may have a lower core structure 168 respectively provided as an upper cylinder 150 and a lower cylinder 170. The upper cylinder 150 and the lower cylinder 170 may be interconnected by a cylinder attach fitting 118. The core structural assembly 114 may be configured to support the primary loads acting on the upper and lower spacecraft 146, 166 including axial loads 104, bending loads 106, and torsional loads 108.

FIG. 2 is a perspective illustration of the upper spacecraft 146 and the lower spacecraft 166 in the dual-manifest launch configuration 102. Advantageously, the upper spacecraft 146 and the lower spacecraft 166 may be economically provided by using similar upper and lower cylinders 150, 170 which may each support a common electronics module 300. The electronics module 300 may be comprised of a load-carrying module structure 302 including a spaced pair of payload equipment panels 316, vertical shear panels 340, and top and bottom end panels 326, 330 which may be coupled to the upper and lower cylinder 150, 170 at common interface locations 352. In the present disclosure, the electronics module 300 is defined as including operational components such as antennae 370, solar panels 354, thermal radiator panels 320, thrusters 388, and other components that may be coupled to the module structure 302 at outer spacecraft interfaces. Advantageously, the use of the common electronics module 300 for the upper spacecraft 146 and the lower spacecraft 166 significantly reduces part count, non-recurring design costs, and manufacturing, testing, and integration cost and schedule.

Furthermore, the use of a central cylindrical core structural assembly 114 for carrying the axial, bending, and torsional loads 104, 106, 108 advantageously provides a lightweight structural solution for the dual-manifest launch configuration 102. In this regard, the upper cylinder 150 may advantageously be provided in a lower mass configuration that the upper cylinder 150 which may have a higher-strength and heavier wall construction to allow the lower cylinder 170 to carry the combined mass of the upper spacecraft 146 and the lower spacecraft 166. In this manner, the presently-disclosed core structural assembly 114 avoids the significant mass penalty otherwise incurred if the upper spacecraft 146 had the same core structure as the lower spacecraft 166. Advantageously, the upper cylinder 150 and the lower cylinder 170 have substantially similar geometry and substantially similar interface locations 352 for attachment to the common electronics module 300. The substantial similarity in the geometry and configuration of the upper and lower spacecraft allows for using the same manufacturing and testing sequences and the same integration flow for each spacecraft 146, 166 which may be processed together. For example, the common configurations of the upper and lower spacecraft 146, 166 allows for using the same ground support equipment, same ground handling equipment, and common shipping containers. The commonality of the upper and lower spacecraft 146, 166 significantly reduces the cost and schedule for design, analysis, manufacturing, testing, and payload integration.

FIG. 3 shows an embodiment of the upper spacecraft 146 with solar panels 354 and antennae 370 in a deployed position. Each one of the solar panels 354 may be mounted on a solar panel mast 358 which may be coupled to the module structure 302 of the electronics module 300. For example, each one of the upper and lower spacecraft 146, 166 may include a pair of deployable solar panels 354 that may be coupled to the pair of payload equipment panels 316 on opposite sides of the upper and lower cylinder 150, 170. Each one of the solar panel masts 358 may be operatively coupled to a solar panel fitting 362 at a solar panel mast interface 360 at each one of the payload equipment panels 316.

In FIG. 3, each one of the upper and lower spacecraft 146, 166 may include one or more antennae 370 that may be coupled to the module structure 302. For example, FIG. 3 illustrates the upper spacecraft 166 having deployable antennae 370 mounted on an antenna boom 374 that may be coupled to the bottom end panel 330 at an antenna mast interface 376 on opposite sides of the bottom end panel 330. Each antenna mast 372 may include one or more antenna booms 374 extending outwardly from antenna mast 372 for supporting one or more antennae 370. Each one of the upper and lower spacecraft 146, 166 may further include a pair of thermal radiator panels 320. For example, one or more thermal radiator panels 320 may be coupled to or integrated with the payload equipment panels 316 located on opposing sides of the upper cylinder 150 and/or lower cylinder 170. The thermal radiator panels 320 may provide thermal management for the various spacecraft components.

Figure 4:
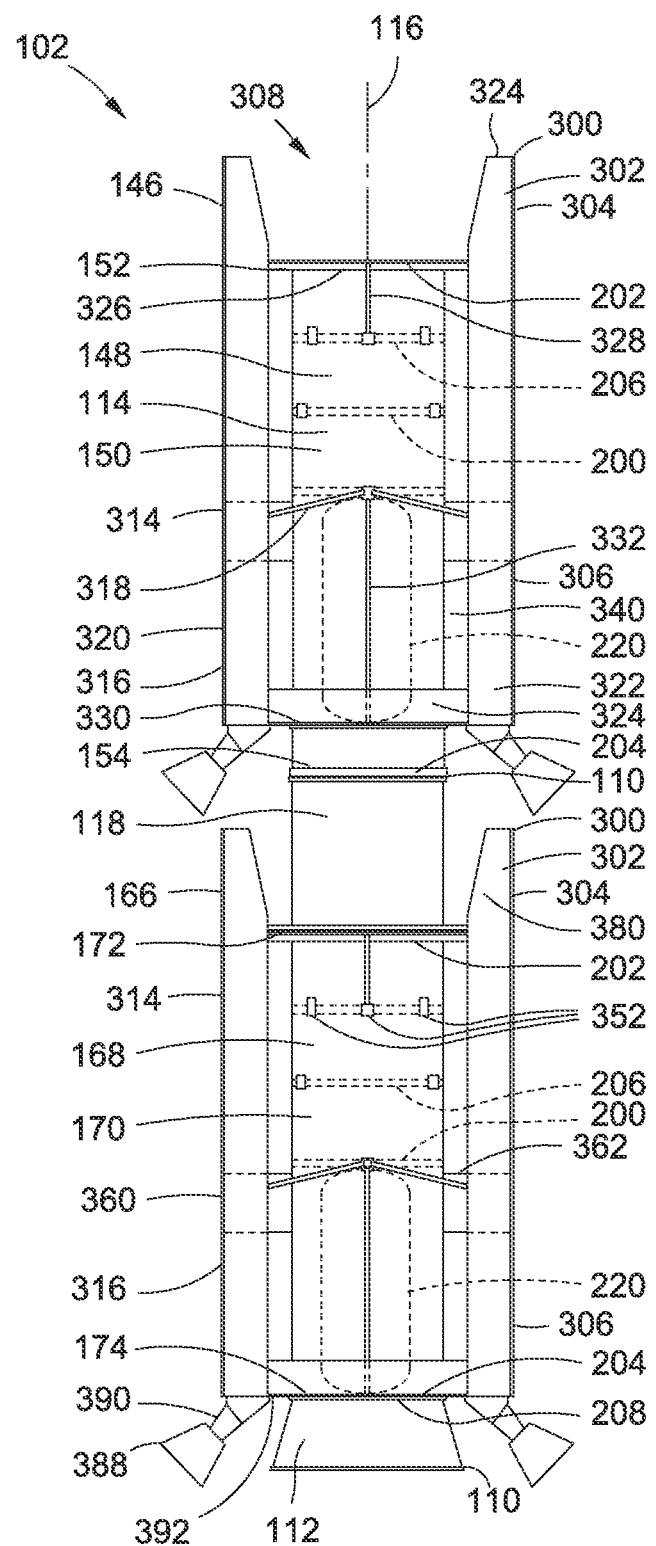
FIG. 4 is a side view of the upper spacecraft and lower spacecraft with the antenna omitted for clarity to illustrate a core structural assembly comprising an upper core structure coupled to a lower core structure.

FIG. 4 shows an embodiment of the upper spacecraft 146 and the lower spacecraft 166 in the dual-manifest launch configuration 102 with the antenna 370 omitted to illustrate the core structural assembly 114. The core structural assembly 114 may extend along a longitudinal axis 116 and may comprise the upper core structure 148 coupled to the lower core structure 168. As indicated earlier, the upper core structure 148 may include the upper cylinder 150 configured to support the upper spacecraft 146. The lower core structure 168 may include the lower cylinder 170 configured to support the lower spacecraft 166 with the upper cylinder 150 mounted on top of the lower cylinder 170 in the dual-manifest launch configuration 102.

Figure 5:
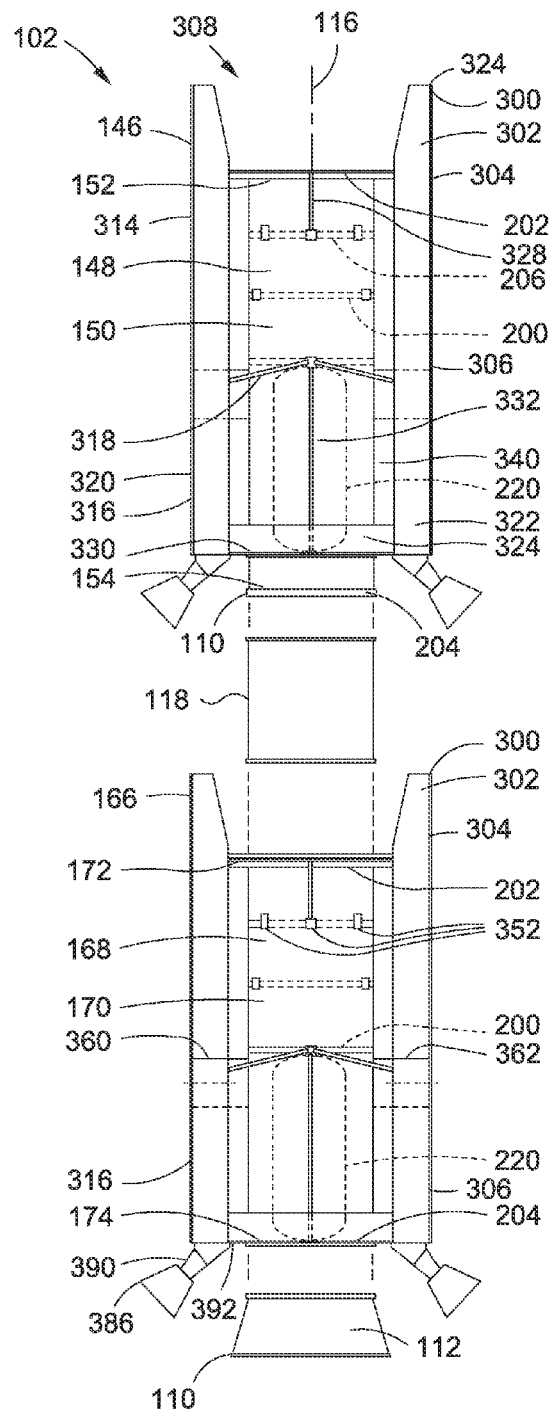
FIG. 5 is a side view of the upper spacecraft and lower spacecraft separated from one another and illustrating a cylinder attach fitting for coupling an upper cylinder to a lower cylinder.

FIG. 5 shows the upper spacecraft 146 and the lower spacecraft 166 separated from one another. In an embodiment, the core structural assembly 114 may include the cylinder attach fitting 118 for coupling the upper cylinder 150 to the lower cylinder 170. In an embodiment, the cylinder attach fitting 118 may be provided in a geometry that may be similar to the geometry of the upper and lower cylinder 150, 170 to simplify manufacturing. For example, the cylinder attach fitting 118 may be provided in the same inner diameter as the upper and lower cylinder 150, 170, but in a shorter length than the upper and lower cylinder 150, 170 which may allow for manufacturing the cylinder attach fitting 118 using the same tooling used in the manufacturing the upper and lower cylinder 150, 170. The bottom end 154 of the upper cylinder 150 and the top end of the cylinder attach fitting 118 may define a separation plane 110 for the upper spacecraft 146. The bottom end of the cylinder attach fitting 118 may be coupled to the top end 172 of the lower spacecraft 166 by means of mechanical fasteners to allow for integration of the upper spacecraft 146 with the lower spacecraft 166. FIG. 5 further illustrates the payload attach fitting 112 which may be coupled to the lower cylinder 170. The bottom end of the payload attach fitting 112 may define a separation plane 110 with the launch vehicle 100.

Figure 6:
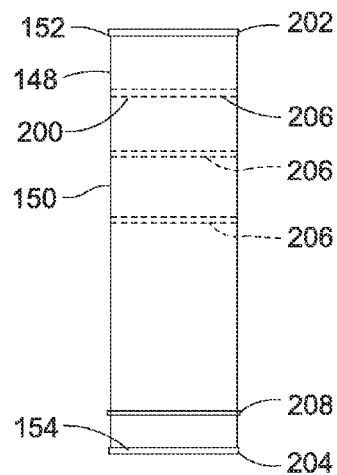
FIG. 6 is a side view of the upper cylinder.

FIG. 6 is a side view of the upper core structure 148 of the upper spacecraft 146. The upper core structure 148 may be comprised of the upper cylinder 150 and the reinforcing rings 200 that may be coupled to the upper cylinder 150. The reinforcing rings 200 may advantageously be installed at substantially the same locations on the upper cylinder 150 and the lower cylinder 170. In the embodiment shown, the upper cylinder 150 may be formed in a generally constant cylindrical cross-section having a substantially constant upper cylinder inner diameter 156 extending along a length of the upper cylinder 150. The substantially constant cross-sectional shape of the upper cylinder 150 may significantly simplify design and manufacturing of the upper cylinder 150. However, it is contemplated that the upper cylinder 150 may be formed in a cross-section that may vary at one or more locations along the length of the upper cylinder 150. The upper cylinder bottom end 154 may extend below the bottom end panel 330 of the electronics module 300 such that the separation plane 110 and separation hardware (not shown) associated with the cylinder attach fitting 118 may be spaced away from the electronics module 300.

Figure 7:
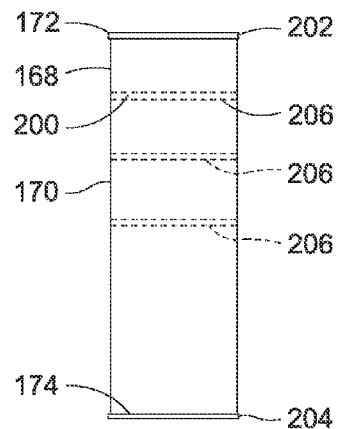
FIG. 7 is a side view of the lower cylinder.

FIG. 7 is a side view of the lower core structure 168 of the lower spacecraft 166. The lower core structure 168 may be comprised of the lower cylinder 170 and one or more reinforcing rings 200 that may be coupled to the lower cylinder 170. Advantageously, the lower cylinder 170 may be configured in a geometry that may be substantially similar to the geometry of the upper cylinder 150. For example, the lower cylinder 170 may have a lower cylinder inner diameter 176 (FIG. 12) that may be substantially similar to (e.g., equivalent to) the upper cylinder inner diameter 156 (FIG. 10) which may allow for manufacturing the upper cylinder 150 and the lower cylinder 170 with the same tooling. In this regard, the lower cylinder 170 may be provided with a generally constant cylindrical cross-section having a substantially constant lower cylinder inner diameter 176.

In FIG. 7, the upper cylinder top end 152 may extend from the top end panel 326 of the electronics module 300 to the bottom end panel 330 of the electronics module 300. The upper cylinder bottom end 154 may be configured to be coupled to the payload attach fitting 112 which may be conically-shaped for interfacing with the launch vehicle 100. In FIGS. 6-7, the upper cylinder 150 may have a longer length than the lower cylinder 170 due to the upper cylinder 150 extending below the bottom end panel 330 of the common electronics module 300. However, the upper cylinder 150 may be provided in the same length as the lower cylinder 170 such that the upper cylinder 150 and the lower cylinder 170 may be interchangeable.

FIG. 8 is a perspective illustration of the upper cylinder 150 having end rings 202, 204 mounted on the upper cylinder top end 152 and the upper cylinder bottom end 154 for interfacing with module structure 302 and/or the cylinder attach fitting 118. The upper cylinder 150 may include a plurality of reinforcing rings 200 positioned at one or more locations along the length of the upper cylinder 150 to increase the strength of the upper cylinder 150 and/or to accommodate localized loads on the upper cylinder 150. The reinforcing rings 200 may be configured as internal rings 206 and/or external rings 208. The reinforcing rings 200 may be fixedly coupled (e.g., adhesively bonded and/or mechanically fastened) to the upper cylinder 150 at one or more common interface locations 352 such as where the electronics module 300 is attached to the upper cylinder 150. As indicated above, the upper cylinder 150 and the lower cylinder 170 may have a substantially similar geometry and configuration, and may include the same quantity of reinforcing rings 200 positioned at substantially similar interface locations 352. The relative position of the reinforcing rings 200 (e.g., internal rings 206 and/or external rings 208) on the upper cylinder 150 and the lower cylinder 170 may coincide with the common interface locations 352 where the electronics module 300 may be coupled to the upper cylinder 150 and the lower cylinder 170.

FIG. 9 is a sectional view of an embodiment of the upper cylinder 150 and illustrating the internal rings 206 mounted to the upper cylinder 150 and further illustrating a propellant tank 220 housed within the upper cylinder 150. The propellant tank 220 may be configured to contain propellant for a spacecraft propulsion system (not shown) for orbit insertion and/or station-keeping and or for an attitude control system (not shown) that may be included with the upper spacecraft 146 and/or lower spacecraft 166. In this regard, the upper and lower spacecraft 146, 166 may be configured as 3-axis-stabilized spacecraft. However, the upper and lower spacecraft 146, 166 may be configured as spin-stabilized spacecraft. The propellant tank 220 may be supported by a generally planar upper tank support 222 that may be coupled to an internal ring 206. A conical lower tank support 224 may be the coupled to aft end ring 204 that may be mounted to an upper cylinder bottom end 154. The lower cylinder 170 may also include a propellant tank 220 that may be supported using an upper tank support 222 and a lower tank support 224 and configured similar to the tank support system of the upper cylinder 150 of FIG. 9.

FIGS. 10-11 are cross-sectional illustrations of an embodiment of the lower cylinder 170 formed as a solid laminate 182 of fiber-reinforced polymer matrix material 180. FIG. 10 illustrates the lower cylinder 170 formed at a lower cylinder inner diameter 176. FIG. 11 is an enlarged view of a portion of the lower cylinder 170 cross-section illustrating a plurality of composite plies that may make up the solid laminate 182. The solid laminate 182 may be provided in a lower cylinder wall thickness 178 that may allow the lower cylinder 170 to carry the combined mass of the upper spacecraft 146 and the lower spacecraft 166. In this regard, the solid laminate 182 may provide the lower cylinder 170 with the strength and stiffness required to carry the axial, bending, and torsional loads 104, 106, 108 (FIG. 1) of the upper and lower spacecraft 146, 166 in the dual-manifest launch configuration 102.

FIGS. 12-13 are cross-sectional illustrations of an embodiment of the upper cylinder 150 formed as a composite sandwich 184. FIG. 12 illustrates the upper cylinder 150 formed in an upper cylinder inner diameter 156 which may be substantially equivalent to the lower cylinder inner diameter 176 to allow for the use of common tooling for manufacturing the upper cylinder 150 and the lower cylinder 170. FIG. 13 is an enlarged view of a portion of the upper cylinder 150 cross-section illustrating the composite sandwich 184 comprised of a core layer 186 and a pair of laminated face sheets 188 on opposite sides of the core layer 186. The laminated face sheets 188 may be formed of fiber-reinforced polymer matrix material 180 similar to the reinforced polymer matrix material for the solid laminate 182 described above. In an embodiment, the laminated face sheets 188 may be formed of a plurality of laminated composite plies formed of carbon fiber composite material although the composite maternal may be formed of other types of fibers and is not limited to carbon fibers. The core layer 186 may be formed of a multi-cell material such as foam, honeycomb, or other core material having cells oriented generally perpendicular to the laminated face sheets 188. In an embodiment, the core layer 186 may comprise honeycomb core formed of aluminum, aramid, fiberglass, or other material.

In FIGS. 10-13, the solid laminate 182 of the lower cylinder 170 and/or the laminated face sheets 188 of the upper cylinder 150 may be formed of uncured or pre-cured composite material such as pre-impregnated fiber-reinforced material (e.g., pre-preg) and/or resin-infused composite material polymer matrix. The composite material may include carbon fibers, glass fibers, ceramic fibers, or other fiber types which may be unidirectional, woven, chopped, or provided in other fiber arrangements. The composite material may include a polymeric material or resin matrix such as epoxy resin or other resin. The resin matrix may comprise a thermosetting resin, or the resin matrix may comprise a thermoplastic resin. Although the lower cylinder 170 is described as being formed as a solid laminate 182, the lower cylinder 170 may be formed as a composite sandwich 184. Similarly, although the upper cylinder 150 is described as being formed as a composite sandwich 184, the upper cylinder 150 may be formed as a solid laminate 182.

FIGS. 14-15 show a common electronics module 300 coupled to the upper cylinder 150 (FIG. 14) and the lower cylinder 170 (FIG. 15). The upper cylinder 150 and the lower cylinder 170 may be configured to be coupled to the electronics module 300 at substantially the same interface locations 352 such as along the cylinder sides and at the reinforcing rings 200. Each electronics module 300 may include a common module structure 302 as indicated above. The module structure 302 may be defined as the load-carrying structure for the electronics module 300 and may be coupled to the upper cylinder 150 and the lower cylinder 170.

In FIGS. 14-15, in an embodiment, the module structure 302 may include a plurality of module sides 304. For example, the module structure 302 may include four (4) module sides 304 including two (2) open sides 308 and two (2) closed sides 306. The closed sides 306 may be covered by rigid panels 314 configured as the above-described payload equipment panels 316. The open sides 308 may be devoid of rigid panels 314 which may advantageously allow for access to the various components in the interior of the spacecraft during assembly, testing, and integration. Prior to launch, the open sides 308 may be covered by a non-rigid closeout 310 (FIG. 3) such as a flexible thermal blanket 312 (FIG. 3) for providing thermal shielding, electromagnetic-interference (EMI) shielding, and/or radiation shielding for the spacecraft interior.

The module structure 302 may further include vertical shear panels 340, a top end panel 326, and a bottom end panel 330 for coupling the rigid panels 314 to the upper cylinder 150 and the lower cylinder 170 at one or more common interface locations 352. As shown in FIGS. 2-3, the module structure 302 may function as the structural support for mounting various operational components such as thermal radiator panels 320, thrusters 388, solar panels 354, antennae 370, and other secondary structure 350 that may be coupled to the module structure 302 and/or to the upper and lower cylinder 150, 170. The thrusters 388 may be mounted on thruster brackets 390 located at thruster bracket interfaces 392 on the bottom end panel 330 of the module structure 302. However, the thruster brackets 390 may be mounted at other thruster bracket interface 392 locations on the module structure 302.

In FIGS. 14-15, the module structure 302 may include a pair of the rigid panels 314 which may be oriented generally parallel to one another and positioned on opposite sides of the upper cylinder 150 and the lower cylinder 170. The rigid panels 314 may be generally planar and oriented in general alignment with the longitudinal axis 116. In an embodiment, the rigid panels 314 may be configured as the payload equipment panels 316. Each one of the payload equipment panels 316 may have one or more reinforcing corner beams 322 extending along the side edges of the payload equipment panels 316 for providing stiffness and strength to the payload equipment panels 316. One or more end beams 324 may be included along the upper edge and/or lower edge of each payload equipment panel 316 for increasing the strength and rigidity of the payload equipment panel 316. Each payload equipment panel 316 may include one or more stiffeners extending between the corner beams 322. For example, one or more panel inner stiffeners 334 may be mounted on an inboard side of each payload equipment panel 316 for increasing the strength and stiffness of each payload equipment panel 31.

In FIGS. 14-15, the payload equipment panels 316 may be configured for mounting components (not shown) or equipment (not shown) such as on an inboard side of the payload equipment panels 316. Although not shown, such components may include telemetry and spacecraft control components, communications components such as receivers, transmitters, and transponders, and other components. The payload equipment panels 316 may be formed of composite material. For example, the payload equipment panels 316 may be provided in a light weight and stiff composite sandwich construction. However, the payload equipment panels 316 may be formed of metallic material or other materials.

FIG. 16 is an exploded illustration of a module structure 302 showing the interconnection of the module structure 302 to an upper cylinder 150 at a plurality of common interface locations 352. The module structure 302 may include a pair of vertical shear panels 340 which may extend lengthwise along a side of the upper cylinder 150 and the lower cylinder 170 in general alignment with the longitudinal axis 116. In an embodiment, each vertical shear panel 340 may be mechanically coupled to a side of the upper cylinder 150 and lower cylinder 170 using mechanical fasteners and/or by adhesive bonding. The vertical shear panels 340 may extend generally radially outwardly from opposite sides of the upper cylinder 150 for coupling the payload equipment panels 316 to the upper cylinder 150 and the lower cylinder 170. Each vertical shear panel 340 may be comprised of a shear panel upper portion 342 and a shear panel lower portion 344 which may be separated by a solar panel fitting 362. The panel inner stiffeners 334 on the inner side of each one of the payload equipment panels 316 may be interconnected by the solar panel fitting 362. The payload equipment panels 316 may be supported by a payload equipment panel brace 318 extending from a common interface location at an internal ring 206 on each side of the upper cylinder 150.

FIG. 17 is a side view of the module structure 302 illustrating a plurality of braces coupling the module structure 302 to the common interface locations 352 on the upper cylinder 150. The top end panel 326 and the bottom end panel 330 may be located on opposite ends of the module structure 302. The top end panel 326 may be coupled to the upper cylinder top end 152, and the bottom end panel 330 may be coupled to the upper cylinder bottom end 154. The top end panel 326 and the bottom end panel 330 may be generally parallel to one another and oriented normal to the longitudinal axis 116. The payload equipment panels 316 may generally extend between the top end panel 326 and the bottom end panel 330. The top end panel 326 and the bottom end panel 330 may be mounted to the upper cylinder 150 at the location of a reinforcing ring 200 such as at forward end ring 202 and the aft end ring 204.

In FIG. 17, the top end panel 326 may be supported by at least one top panel brace 328 extending from each side of the upper cylinder 150 and the lower cylinder 170 at the interface locations 352. Each top panel brace 328 may extend from an interface location 352 at an internal ring 206 on each side of the upper cylinder 150. Similarly, the bottom end panel 330 may be supported by an antenna brace 332 extending downwardly from an interface location 352 at an internal ring 206 on each side of the upper cylinder 150. The antenna brace 332 may provide support along an axial direction for the antenna mast interface 376 located on opposite sides of the bottom end panel 330.

Figure 18:
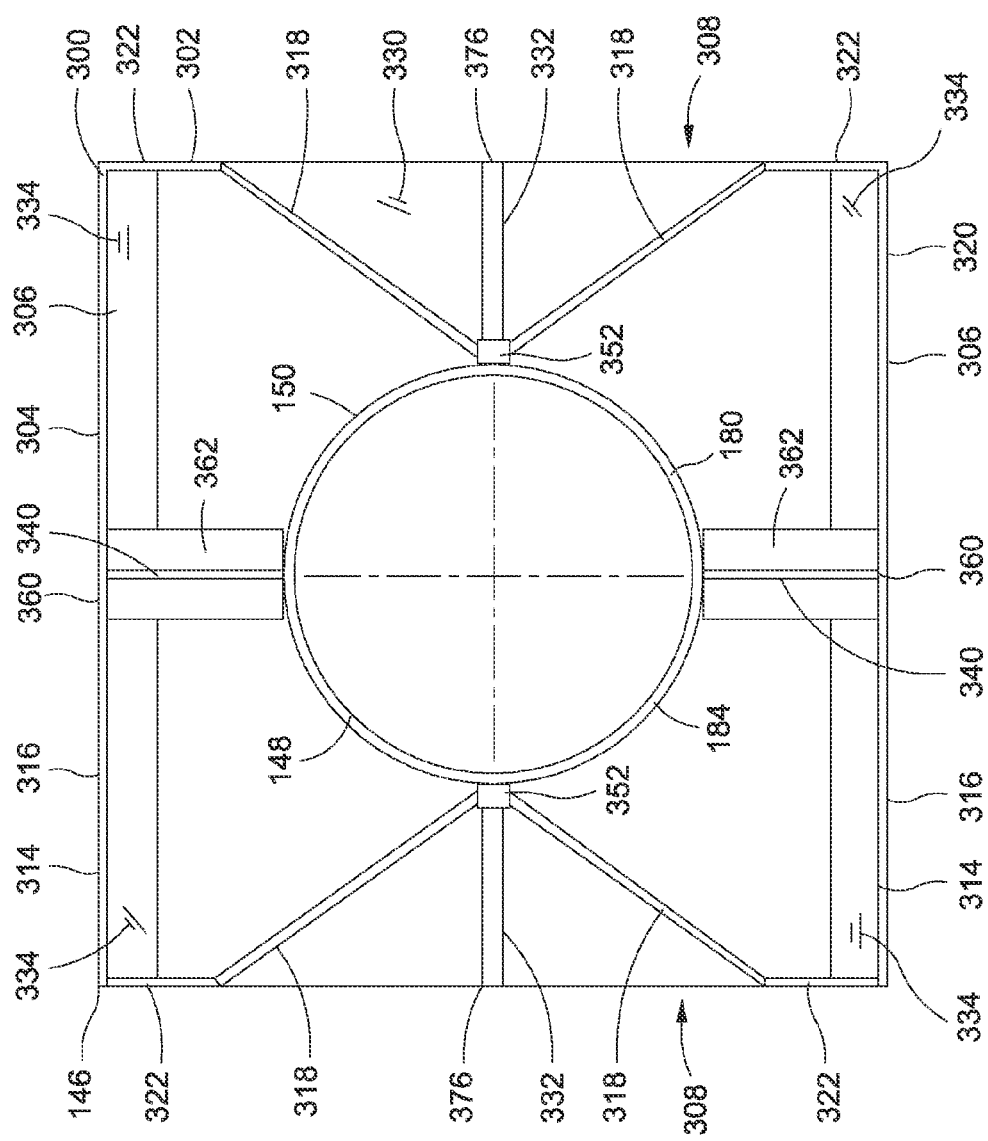
FIG. 18 is a cross-sectional illustration of the spacecraft taken along line 18 of FIG. 17 and illustrating the coupling of the module structure to the upper cylinder at the interface locations.

FIG. 18 is a cross-sectional view of the spacecraft illustrating the coupling of the module structure 302 to the upper cylinder 150 at the interface locations 352. The payload equipment panels 316 may be coupled to the upper cylinder 150 by means of the vertical shear panels 340 extending radially outwardly from the upper cylinder 150. The payload equipment panels 316 may be supported against out-of-plane bending by a pair of payload equipment panel 316 braces extending from each side of the upper cylinder 150. FIG. 18 illustrates an antenna brace 332 extending from each side of the upper cylinder 150 for supporting the antenna mast interfaces 376 on opposite sides of the bottom end panel 330.

Figure 19:
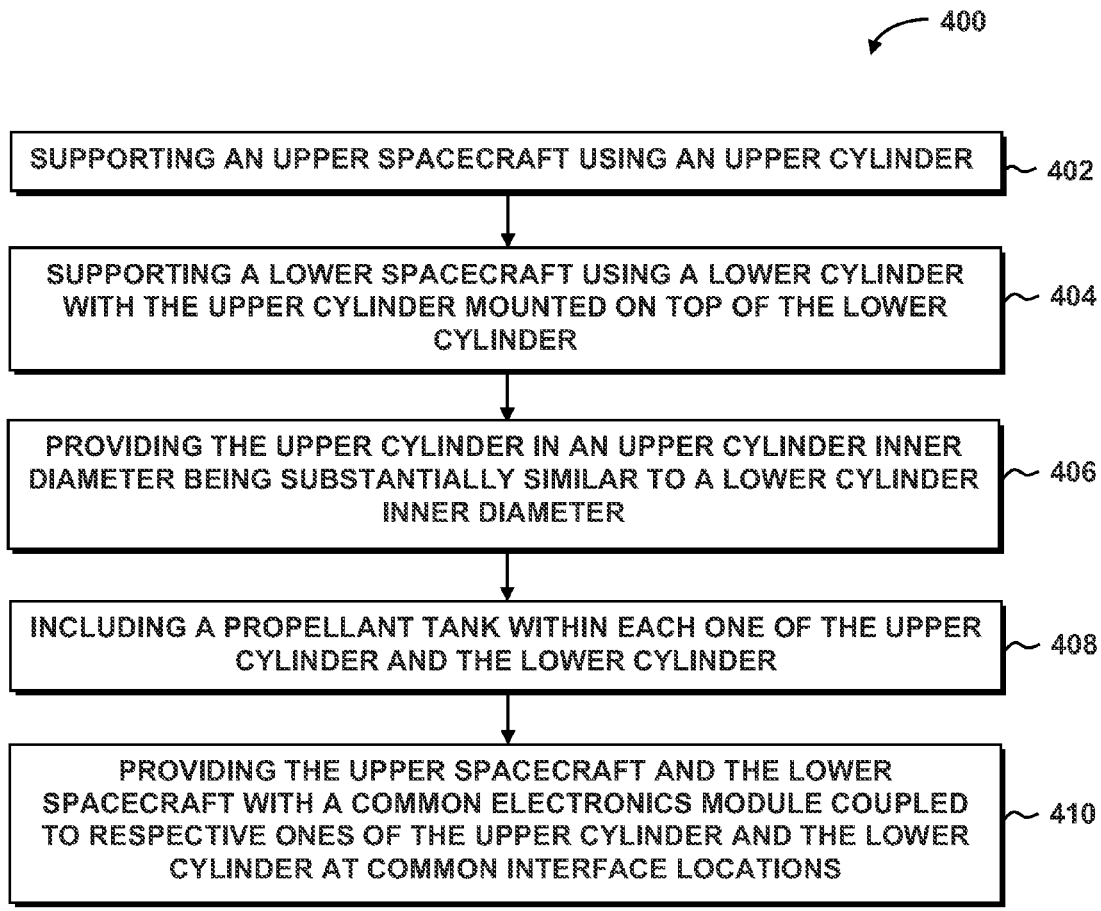
FIG. 19 is an illustration of a flow chart of a method of assembling a spacecraft for a dual-manifest launch configuration.

FIG. 19 is a flow chart illustrating a method 400 of transporting a pair of spacecraft in a dual-manifest launch configuration 102. In an embodiment, the method may include launching an upper spacecraft 146 and a lower spacecraft 166 coupled to a launch vehicle similar to the launch vehicle 100 shown in FIG. 1. The launch vehicle 100 may be configured to place the upper spacecraft 146 and/or the lower spacecraft 166 in orbit above a planetary body (not shown) such as above the Earth (not shown). The operation of placing the upper and lower spacecraft 146, 166 in orbit may be performed by a launch services provider such using a launch vehicle.

The method 400 of FIG. 19 may include Step 402 of supporting the upper spacecraft 146 using an upper cylinder 150. As indicated above, in an embodiment, the method may include providing the upper cylinder 150 as a composite sandwich 184 having a pair of laminated face sheets 188 formed of fiber-reinforced polymer matrix material 180 wherein the laminated face sheets 188 are positioned on opposite sides of a core layer 186.

Step 404 of the method 400 of FIG. 19 may include supporting the lower spacecraft 166 using a lower cylinder 170 and wherein the upper cylinder 150 is mounted on top of the lower cylinder 170. The lower cylinder 170 may be formed as a solid laminate 182 of fiber-reinforced polymer matrix material 180. As indicated above, the solid laminate 182 may have a greater load-carrying capability than the lighter-weight upper cylinder 150.

Step 406 of the method 400 of FIG. 19 may include providing the upper cylinder 150 in an upper cylinder inner diameter 156 that is substantially similar to the lower cylinder inner diameter 176. The upper cylinder and the lower cylinder 170 may be provided in substantially similar geometry which may reduce the manufacturing costs for the upper spacecraft 146 and the lower spacecraft 166 in the dual-manifest launch configuration 102.

Step 408 of the method 400 of FIG. 19 may include providing or including a propellant tank 220 within the upper cylinder 150 and the lower cylinder 170. Advantageously, the propellant tank 220 may be installed in the upper cylinder 150 and the lower cylinder 170 at substantially the same attachment locations and/or using the same hardware due to the substantially similar inner diameters of the upper cylinder 150 and lower cylinder 170. In an embodiment, the propellant tank 220 may be mounted inside each cylinder 150, 170 using an upper tank support 222 coupled to an internal ring 206 at a common interface location 352, and a lower tank support 224 coupled to an aft end ring 204 of each cylinder 150, 170 as described above.

Step 410 of the method 400 of FIG. 19 may include providing the upper spacecraft 146 and the lower spacecraft 166 with a common electronics module 300 coupled to respective ones of the upper cylinder 150 and the lower cylinder 170 at common interface locations 352. In this regard, the electronics module 300 of the upper spacecraft 146 may be coupled to the upper cylinder 150 at the same relative interface locations 352 where the electronics module 300 of the lower spacecraft 166 is coupled to the lower cylinder 170. For example, the method may include coupling the electronics module 300 to one or more reinforcing rings 200 at the same interface locations 352 on the upper cylinder 150 and the lower cylinder 170.

The method of transporting the spacecraft may further include providing each one of the upper spacecraft 146 and the lower spacecraft 166 with a spaced pair of rigid panels 314 or payload equipment panels 316 coupled to respective ones of the upper cylinder 150 and the lower cylinder 170 on opposite sides thereof wherein the rigid panels 314 may be oriented in general alignment with the longitudinal axis 116 of the spacecraft 146, 166. As indicated above, the rigid panels 314 may be configured as payload equipment panels 316 which may close out the module sides 304 of the module structure 302. The method may further include omitting a rigid member (not shown) or other torsional-resisting member from the open sides 308 of the module structure 302 to minimize the mass of the upper and lower spacecraft 146, 166 and to allow for access to the spacecraft interior during assembly, testing, and integration. At least a portion of the open sides 308 may be covered with a non-rigid closeout 310 such as a thermal blanket 312.

The method of transporting the spacecraft may additionally include providing each one of the upper spacecraft 146 and the lower spacecraft 166 with a pair of vertical shear panels 340 extending radially outwardly from opposite sides of respective ones of the upper cylinder 150 and lower cylinder 170 at common interface locations 352. The method may further include providing each one of the upper spacecraft 146 and the lower spacecraft 166 with a top end panel 326 and a bottom end panel 330 mounted on opposite ends of the module structure 302 of the electronics module 300, and configuring the payload equipment panels 316 to extend between the top end panel 326 and the bottom end panel 330.

The top end panel 326 and the bottom end panel 330 may be coupled to the payload equipment panels 316. Secondary structure 350 may be coupled to the module structure 302 such as thermal radiator panels 320 which may be coupled to the payload equipment panels 316. In addition, one or more antennae 370 may be coupled to the module structure 302. For example, a pair of deployable antennae 370 may be coupled to the bottom end panel 330 on opposite sides thereof. A pair of deployable solar panels 354 may also be coupled to each one of the payload equipment panels 316 via solar panel fittings 362.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A dual-manifest spacecraft assembly, comprising:
an upper core structure and a lower core structure;
the upper core structure including an upper cylinder extending through a center of an upper spacecraft of a dual-manifest launch configuration;
the lower core structure including a lower cylinder extending through a center of a lower spacecraft with the upper cylinder mounted on top of the lower cylinder;
the upper cylinder having an upper cylinder inner diameter being substantially equivalent to a lower cylinder inner diameters;
at least one of the upper spacecraft and the lower spacecraft including a pair of payload equipment panels coupled to opposite sides of the respective upper and lower cylinder; and
the payload equipment panels being in general alignment with a longitudinal axis of the spacecraft.

2. The spacecraft assembly of claim 1, wherein:
the lower cylinder is formed as a solid laminate of fiber-reinforced polymer matrix material.

3. The spacecraft assembly of claim 1, wherein:
the upper cylinder is formed as a composite sandwich.

4. The spacecraft assembly of claim 1, further comprising:
a first propellant tank housed within the upper cylinder and a second propellant tank housed within the lower cylinder.

5. The spacecraft assembly of claim 1, wherein:
at least one of the upper cylinder and the lower cylinder is configured to be coupled to a common electronics module at common interface locations; and
at least one of the electronics module includes the pair of payload equipment panels.

6. The spacecraft assembly of claim 5, wherein:
at least one of the upper cylinder and the lower cylinder has a reinforcing ring at the interface locations.

7. The spacecraft assembly of claim 5, wherein:
the at least one of the upper spacecraft and the lower spacecraft including a pair of payload equipment panels comprises a pair of payload equipment panels for the upper spacecraft and a pair of payload equipment panels for the lower spacecraft;
the pair of payload equipment panels of the upper spacecraft being coupled to opposite sides of the upper cylinder;
the pair of payload equipment panels of the lower spacecraft being coupled to opposite sides of the lower cylinder; and
the pair of payload equipment panels of the upper spacecraft and the pair of payload equipment panels of the lower spacecraft being in general alignment with a longitudinal axis of the spacecraft.

8. The spacecraft assembly of claim 7, wherein:
the upper spacecraft includes a pair of vertical shear panels and the lower spacecraft includes a pair of vertical shear panels;
the pair of vertical shear panels of the upper spacecraft extending radially outwardly from opposite sides of the upper cylinder for coupling the pair of payload equipment panels of the upper spacecraft to the upper cylinder; and
the pair of vertical shear panels of the lower spacecraft extending radially outwardly from opposite sides of the lower cylinder for coupling the pair of payload equipment panels of the lower spacecraft to the lower cylinder.

9. The spacecraft assembly of claim 7, wherein at least one of the upper spacecraft and the lower spacecraft includes:
a top end panel and a bottom end panel mounted on opposite ends of the pair of the payload equipment panels of the respective upper spacecraft and the lower spacecraft.

10. The spacecraft assembly of claim 1, wherein:
at least one of the upper spacecraft and the lower spacecraft is configured as a 3-axis-stabilized spacecraft.

11. A dual-manifest spacecraft assembly, comprising:
an upper core structure and a lower core structure;
the upper core structure including an upper cylinder extending through a center of an upper spacecraft of a dual-manifest launch configuration;
the lower core structure including a lower cylinder extending through a center of a lower spacecraft with the upper cylinder mounted on top of the lower cylinder;
the upper cylinder having an upper cylinder inner diameter being substantially equivalent to a lower cylinder inner diameter;
the upper cylinder being configured to be coupled to a common electronics module at common interface locations and the lower cylinder being configured to be coupled to a common electronics module at common interface locations;
the electronics module of the upper cylinder including a pair of payload equipment panels coupled to opposite sides of the upper cylinder;
the electronics module of the lower cylinder including a pair of payload equipment panels coupled to opposite sides of the lower cylinder; and
the pair of payload equipment panels of the upper spacecraft and the pair of payload equipment panels of the lower spacecraft being in general alignment with a longitudinal axis of the spacecraft.

12. A method of transporting a pair of spacecraft in a dual-manifest launch configuration, comprising the steps of:
supporting an upper spacecraft using an upper cylinder extending through a center of the upper spacecraft;
supporting a lower spacecraft using a lower cylinder extending through a center of the lower spacecraft with the upper cylinder mounted on top of the lower cylinder;
providing the upper cylinder in an upper cylinder inner diameter being substantially equivalent to a lower cylinder inner diameter;
providing at least one of the upper and lower spacecraft with a pair of payload equipment panels coupled to opposite sides of the respective upper and lower cylinder; and
the payload equipment panels being in general alignment with a longitudinal axis of the spacecraft.

13. The method of claim 12, further comprising:
providing the lower cylinder as a solid laminate of fiber-reinforced polymer matrix material.

14. The method of claim 12, further comprising:
providing the upper cylinder as a composite sandwich.

15. The method of claim 12, further comprising:
including a first propellant tank within the upper cylinder and a second propellant tank within the lower cylinder.

16. The method of claim 12, further comprising:
providing at least one of the upper spacecraft and the lower spacecraft with a common electronics module coupled to respective ones of the upper cylinder and the lower cylinder at common interface locations; and
the electronics module of the at least one of the upper and the lower spacecraft including the pair of payload equipment panels.

17. The method of claim 16, wherein:
the electronics module is coupled to a reinforcing ring at the interface locations of the at least one of the upper cylinder and the lower cylinder.

18. The method of claim 16, wherein the step of providing at least one of the upper spacecraft and the lower spacecraft with a common electronics module includes:
providing the upper spacecraft with a pair of payload equipment panels coupled to the upper cylinder and providing the lower spacecraft with a pair of payload equipment panels coupled to the lower cylinder;
the pair of payload equipment panels of the upper spacecraft being positioned on opposite sides of the upper cylinder;
the pair of payload equipment panels of the lower spacecraft being positioned on opposite sides of the lower cylinder; and
the pair of payload equipment panels of the upper spacecraft and the pair of payload equipment panels of the lower spacecraft being in general alignment with a longitudinal axis of the spacecraft.

19. The method of claim 18, further including:
providing the upper spacecraft with a pair of vertical shear panels and providing the lower spacecraft with a pair of vertical shear panels;
the pair of vertical shear panels of the upper spacecraft extending radially outwardly from opposite sides of the upper cylinder;
the pair of vertical shear panels of the lower spacecraft extending radially outwardly from opposite sides of the lower cylinder;
the pair of payload equipment panels of the upper spacecraft being coupled to the vertical shear panels of the upper spacecraft; and
the pair of payload equipment panels of the lower spacecraft being coupled to the vertical shear panels of the lower spacecraft.

20. The method of claim 18, further including:
providing at least one of the upper spacecraft and the lower spacecraft with a top end panel and a bottom end panel mounted on opposite ends of the pair of payload equipment panels of the at least one of the upper spacecraft and the lower spacecraft.

\* \* \* \* \*